(12) United States Patent
Zhang et al.

(10) Patent No.: US 9,552,061 B2
(45) Date of Patent: Jan. 24, 2017

(54) EYE GAZE TRACKING USING BINOCULAR FIXATION CONSTRAINTS

(71) Applicant: MICROSOFT TECHNOLOGY LICENSING, LLC, Redmond, WA (US)

(72) Inventors: Zhengyou Zhang, Bellevue, WA (US); Qin Cai, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 14/226,136

(22) Filed: Mar. 26, 2014

(65) Prior Publication Data

US 2015/0277553 A1    Oct. 1, 2015

(51) Int. Cl.
  *G06K 9/00*  (2006.01)
  *G06F 3/01*  (2006.01)
  *G06T 7/00*  (2006.01)

(52) U.S. Cl.
  CPC ........... *G06F 3/013* (2013.01); *G06K 9/00604* (2013.01); *G06T 7/0002* (2013.01); *G06T 7/002* (2013.01); *G06T 2207/10012* (2013.01); *G06T 2207/30196* (2013.01)

(58) Field of Classification Search
  CPC ................ G06T 7/408; G06T 7/0081; G06T 2207/10024; G06K 9/4652; G06F 17/3025
  See application file for complete search history.

(56) References Cited

FOREIGN PATENT DOCUMENTS

WO    2010003410 A1    1/2010
WO    2012055444 A1    5/2012

OTHER PUBLICATIONS

"International Search Report and Written Opinion Issued in PCT Application No. PCT/US2015/020191", Mailed Date: Jun. 10, 2015, 12 Pages.
Sesma-Sanchez, et al., "Gaze Estimation Interpolation Methods Based on Binocular Data", In Proceedings of the IEEE Transactions on Biomedical Engineering, vol. 59, No. 8, Aug. 1, 2012, 9 Pages.
Hansen, et al., "Homography Normalization for Robust Gaze Estimation in Uncalibrated Setups", In Proceedings of the 2010 Symposium on Eye-Tracking Research & Applications, Jan. 1, 2010, 8 Pages.
Kang, et al., "Simplifying the Cross-Ratios Method of Point-of-Gaze Estimation", Published on: Jan. 1, 2007, 4 pages. Available at: http://wjamesmaclean.net/Papers/kang_cmbec07.pdf.
"Dominant Eye vs. Cyclopean Eye in Gaze Interface Tracking", Published on: Nov. 19, 2013, 1 page. Available at: http://www.ariel.ac.il/iem/seminar-ind-en/dominant-eye-vs-cyclopean-eye-in-gaze-interface-tracking.
"Second Written Opinion Issued in PCT Application No. PCT/US2015/020191", Mailed Date: Feb. 22, 2016, 8 Pages.
"International Preliminary Report on Patentability Issued in PCT Patent Application No. PCT/US2015/020191", Mailed Date: Jun. 10, 2016, 8 Pages.

*Primary Examiner* — Duy M Dang

(74) *Attorney, Agent, or Firm* — Stephen A Wight; Sandy Swain; Micky Minhas

(57) ABSTRACT

The subject disclosure is generally directed towards eye gaze detection based upon both eyes being fixated on the same gaze location. In one aspect, an image including a subject's left and right eyes is captured, from which left and right glint and pupil center information are extracted. The left and right glint data and the left and right pupil data are used with left and right bias correction matrices to jointly determine a gaze location.

20 Claims, 7 Drawing Sheets

EYE GAZE TRACKING USING BINOCULAR FIXATION CONSTRAINTS

BACKGROUND

As computers including mobile devices, handheld devices and related technology such as displays have evolved, human input mechanisms have similarly advanced. Natural user interfaces such as based upon speech recognition, head and skeletal tracking and gesture detection are becoming more widespread to supplement, or in some cases replace, keyboard, pointing device (mouse or stylus) and/or recognized symbol/handwriting input. Eye gaze detection is another natural user interface technology.

One type of eye tracking technology is referred to as cross-ratio (CR) based eye-tracking. This technology exploits the invariance of a plane projectivity to enable remote gaze estimation of a subject using a single camera in an uncalibrated setup. In general, infrared light is projected towards a user, with corneal reflections from the user's eye (glints) sensed by the camera and processed to track the gaze.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a gaze detection technology based upon data obtained from both eyes and constraints that relate one eye's data to the other eye's data. Aspects include computing a current gaze location of a subject in a joint error minimization, in which at least four glints are captured in each eye, including computing a current left homography matrix and a current right homography matrix for use with left pupil data and right pupil data in the joint error minimization.

In one aspect, at least four light sources generate corneal reflections as pairs of left and right glints from a subject's left and right eyes. A camera captures a current image containing the left and right glints and left and right pupil data. A binocular computation corrector computes left and right homography matrices based upon the left and right glints, for use with the left and right pupil data in a joint computation of a gaze location. The binocular computation corrector also may use left and right bias correction homography matrices.

One or more aspects are directed towards capturing an image including a subject's left and right eyes from which left and right glints and left and right pupil center information are extracted as left and right glint data and left and right pupil data, respectively. The left and right glint data and the left and right pupil data are used with left and right bias correction matrices to jointly determine a gaze location.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards eye gaze detection based upon the binocular fixation constraint (where binocular fixation is the process of having both eyes directed at the same location at the same time) for use with cross-ratio-based (homography) techniques. In practice, this provides for more accurately estimating eye gaze tracking in cross-ratio-based approaches. Note that the binocular fixation constraint may be particularly useful when depth perception (3D eye gaze) is needed in a given scenario.

In one aspect, left and right bias correction homography matrices are calibrated for a user by using a plurality of gaze position as ground truth for the glints and the pupil center at each gaze point. Note that instead of using a single eye, the glints and pupil data (e.g., pupil centers) from both eyes are captured, along with the pupil data of both eyes, and used at each gaze position in computing the bias correction matrices.

During online operation, in each frame, given the current data comprising the set of glints and the pupil-center for the left and right eyes of the subject, left and right cross-ratio homography matrices are computed. Based upon the computed homography matrices and the calibrated bias correction matrices, the current gaze location is jointly computed. As will be understood, the joint computation is based upon corresponding pairs of left and right eye glints being constrained by their relationship, namely each left and right glint pair commonly reflects from the same one of the light sources. Further, the joint computation is based upon the pupil data (e.g., pupil centers) being constrained by their gazing at the same gaze location.

It should be understood that any of the examples herein are non-limiting. For example, while four light sources and a camera are exemplified, any number of cameras and light sources (that provide a suitable glint pattern) may be positioned in any number of ways. Moreover, the algorithms and the like used to detect eye gaze are only examples, and the technology described herein is independent of and not limited to any particular one, and further is able to be adapted as new algorithms are developed. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in eye gaze detection in general.

Figure 1:
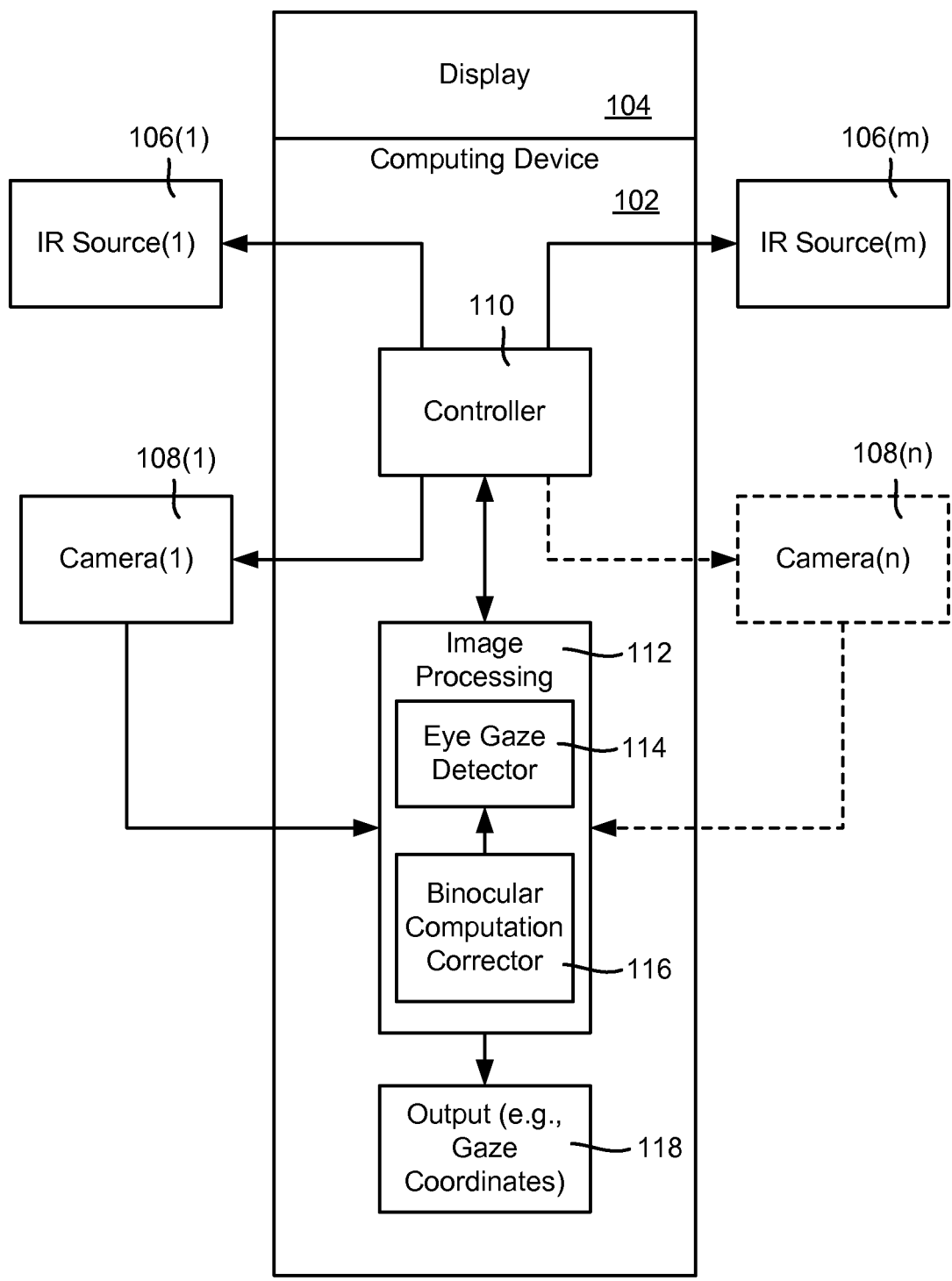
FIG. 1 is a block diagram illustrating example components including a binocular computation model that may be used in eye gaze detection, according to one or more example implementations.

FIG. 1 is a general block diagram illustrating example components that may be used to perform eye gaze detection/tracking. In FIG. 1, a computing device 102 and display 104 are shown. The display 104 may be an external display coupled to the computing device or a display incorporated into the computer device, e.g., its housing.

As shown in FIG. 1, a plurality of IR light sources 106(1)-106(m) is shown, along with one or more IR light-sensitive cameras 108(1)-108(n). Note that for cross-ratio-based eye gaze detection, a single camera is typically sufficient, however if present, images from multiple cameras may be processed and combined in some way (e.g., averaged) such as to reduce the effects of noise.

The light sources may be individual light sources such as laser light emitting diodes (LEDs), and/or LEDs or the like that project through an optical element that diffracts/reflects the light, thereby providing a plurality of light sources. Note that any or all of the IR light-sensitive cameras may be combined with visible light cameras. Note further that the camera (or cameras) may be attached to the device, e.g., embedded in an edge (e.g., the camera 208 of FIG. 2 represented by the circled X) or physically coupled to the device, or may be external to the device (e.g., the camera 508 of FIG. 5), or a combination of both.

Figure 2:
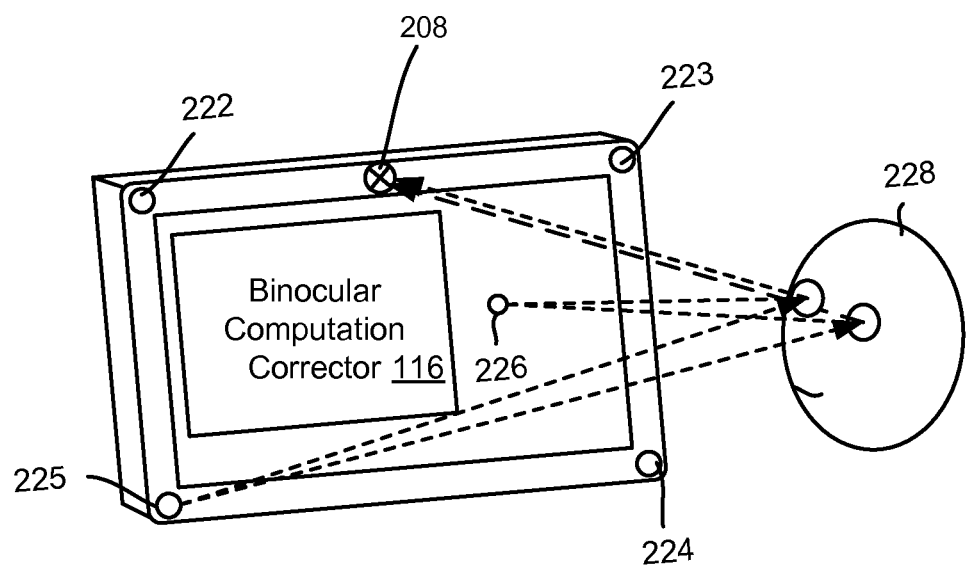
FIG. 2 is a representation of how left and right glints are captured for use in gaze detection for use with a binocular computation model for gaze detection, according to one or more example implementations.

As is understood in cross-ratio based eye-tracking, at least four light sources are needed to provide the glints that are needed to compute the homography, and these light sources are arranged such that there are at least three different directions between any one of them and the others, providing a quadrilateral, e.g., a rectangular pattern of sources 222-225 as in FIG. 2 is a typical arrangement. Notwithstanding, other arrangements including more light source are feasible, and, for example, may provide benefits such as providing at least four glints when one of the other glints is not detected.

A controller 110 may be used to control the operation of the IR light sources 106(1)-106(m) and/or IR light-sensitive cameras 108(1)-108(n), although in one or more implementations the light sources and cameras may be "always-on" whereby no "controller" other than a power source presumably with on/off capabilities is needed. Note that IR light is used because it is not noticeable to humans, however in certain situations it may be desirable to use visible light, such as with the subject's eyes wearing contact lenses that block the particular visible light wavelength being used. Thus, as used herein, "light source" is not limited to IR wavelengths.

In general, the one or more cameras 108(1)-108(n) capture images that are fed to an image processing component 112, including an eye gaze detector 114, which is coupled to a binocular computation corrector 116 (which may include other bias correction) as described herein. The image processing component 112 provides an eye gaze detection output 118, such as gaze coordinates representative of where the user is currently gazing in the given frame or the like being processed. Such output 118 may be buffered, such as for use with other input (e.g., mouse clicks or gestures), may be consumed by an operating system (e.g., to move a cursor), may be used by an application (e.g., to highlight a menu item) and/or the like. In general, the current gaze information may be used to take action with respect to changing a state of a user interface. Eye gaze detection may be used for other state changes, e.g., to turn on a display to an active state from a standby or off state, (or vice-versa), possibly in combination with other (e.g., gesture) detection such as an eye-blinking pattern.

With respect to the eye gaze detector 114, any existing or to-be-developed techniques (such as cross-ratio technology) may be employed to convert sensed glints, pupil data and any other captured features into the eye gaze information output 118. Decisions of one or more as techniques may be combined (e.g., averaged) to make the final output. As described herein, the binocular computation corrector provides the eye gaze detection algorithm 114 with bias-correction that tends to be more accurate than single eye techniques.

In general, remote gaze tracking systems operate using the infrared light sources to generate corneal reflections, referred to as glints, which are captured as part of the subject's eye images. The captured images are processed to extract informative features that are invariant to illumination and viewpoint, such as pupil center, the corneal reflections (e.g., indicative of the eyeball's position) and/or limbus contour.

Note that in FIG. 2, the concept of glints reflected from the IR light source 225 from each eye is shown as being captured by the camera 208 while the user is looking at a current gaze location 226 on the screen. As can be readily appreciated, glints from the other light sources 222-224 are similarly captured at the same time (although only one such set of arrows to the eyes/reflected to the camera is shown in FIG. 2).

Figure 3:
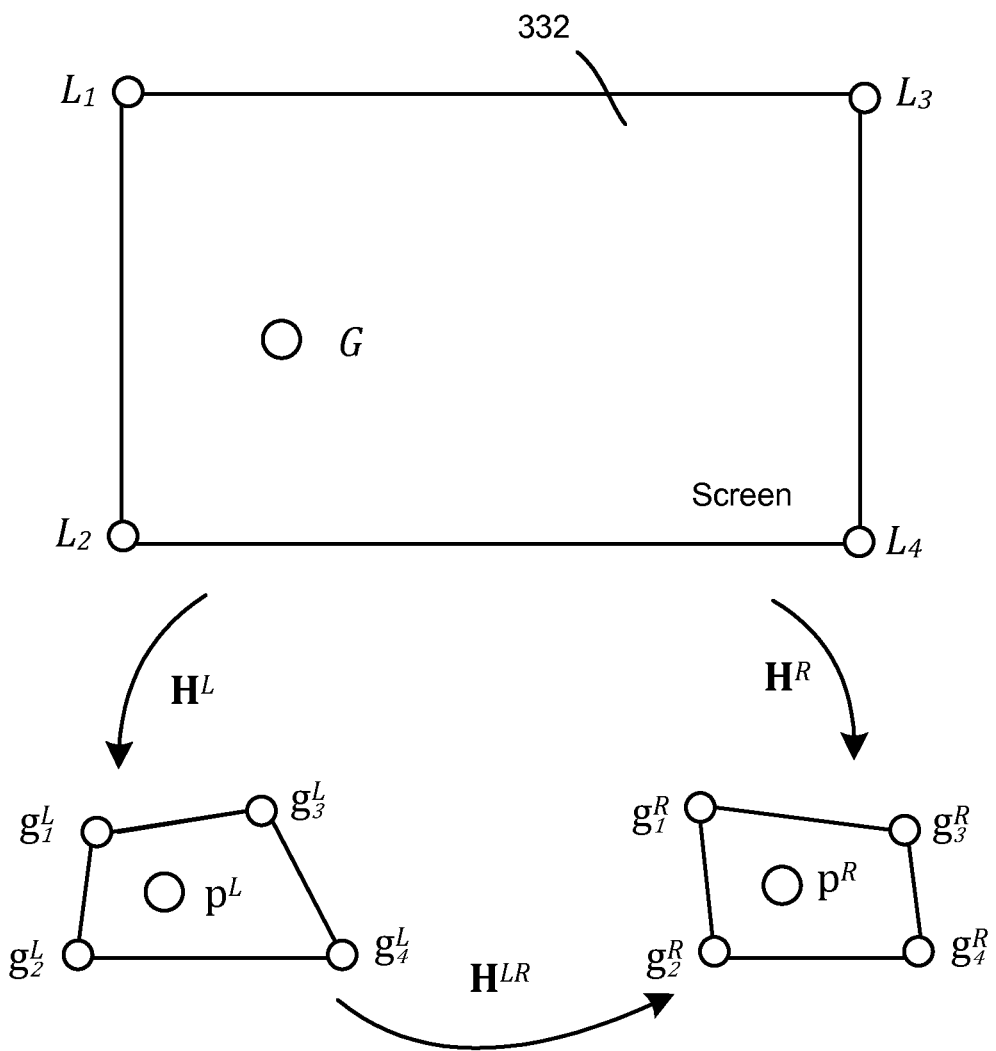
FIG. 3 is a representation of a geometry of light sources and corresponding glints in the left and right eyes for use in gaze detection, according to one or more example implementations.
Figure 4:
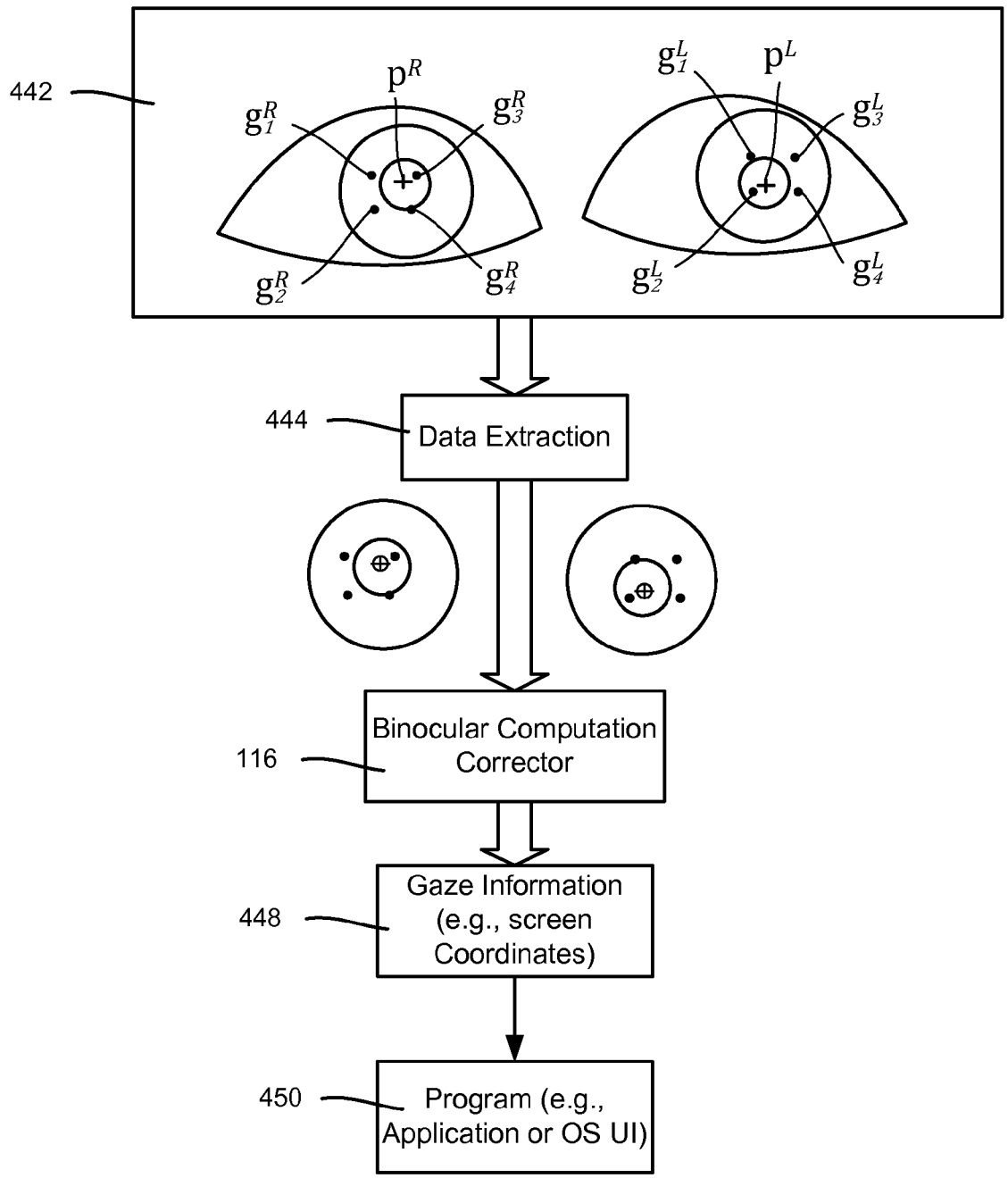
FIG. 4 is a representation of how glints and pupil-related data (e.g., the pupil center) are used to obtain gaze information from a learned adaptive homography mapping model, according to one or more example implementations.

FIGS. 3 and 4 show the concept of left and right glint data and pupil data from a geometric representation and image representation, respectively; (note that left and right are reversed in the image 442). In FIG. 3, $L_1$-$L_4$ represent the light sources and G the gaze position relative to a screen 332. $H^L$ and $H^R$ represent the left and right homography matrices, respectively; as described below, these matrices are related by left and right pairs of the glints (e.g., ($g_1^L$, $g_1^R$)) and thus may be represented by the matrix $H^{LR}$. In FIGS. 3 and 4, $g_1^L$-$g_4^R$ represent the left glints from the light sources $L_1$-$L_4$, and $p^L$ the left pupil center; $g_1^R$-$g_4^R$ represent the right glints and $p^R$ the right pupil center.

FIG. 4 shows a usage model of the glint data, extracted from the image 442 via data extraction 444. This data including glint data and pupil data for each eye is fed to a the binocular computation corrector 116, which outputs the gaze information 448 (e.g., the screen coordinates or the like) computed from the data to a program 450, such as an application, operating system user interface, a remote device or the like. As described below, the binocular computation corrector 116 computes a left homography matrix and a right homography matrix, and may use left and right bias correction matrices, to jointly estimate the gaze information.

As described herein, an accurate and robust gaze estimation technology is based upon homography-based methods for gaze estimation bias correction, which operates via a bias-correcting homography transformation. The bias correcting homography transformation can be computed by solving the point set registration problem from the predicted gaze points by the basic cross-ratio method to ground truth targets on the screen during a calibration training phase. Instead of single eye computations, both eyes are used as set forth below.

Figure 5:
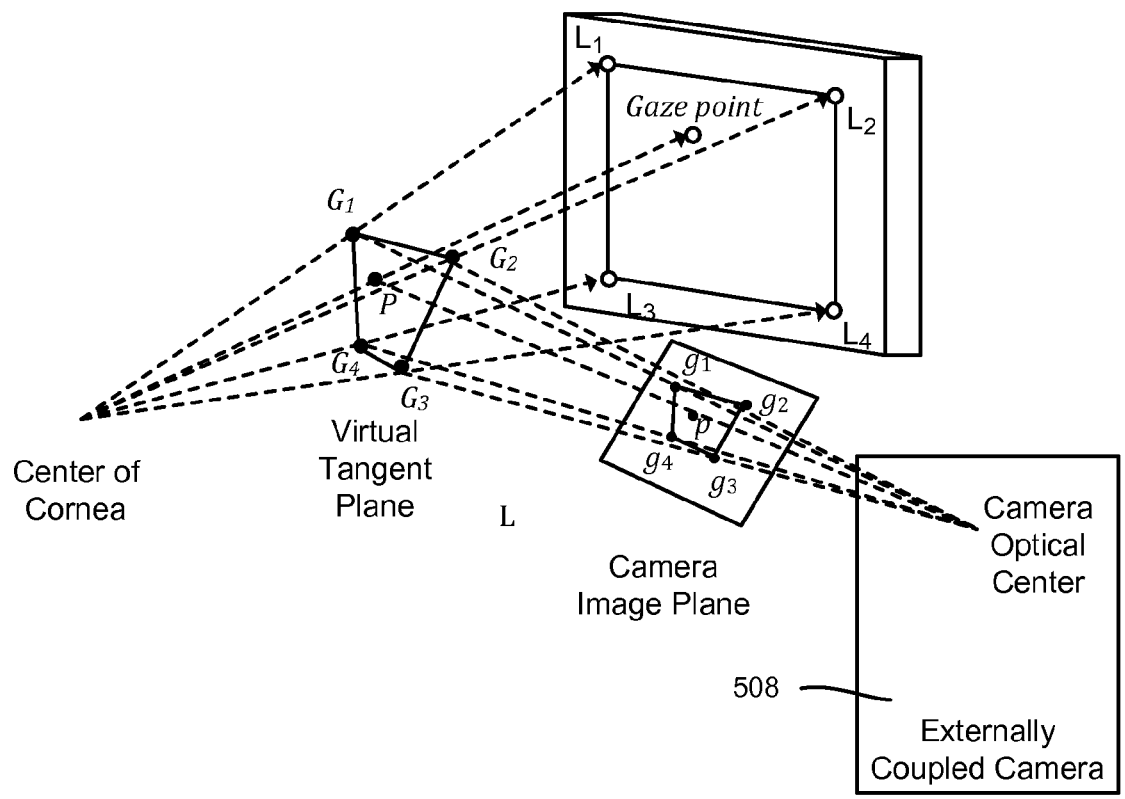
FIG. 5 is a representation of how cross-ratio-based transformations may be used to calibrate a bias correction model, according to one or more example implementations.

In general, homograph-based methods generally work well at the calibration position because they effectively model the optical and visual axis offsets, as generally represented in FIG. 5. The homography-based CR method, illustrated in FIG. 5, is based upon having four or more infrared (IR) lights, $L_1$-$L_4$, positioned around a screen, where i=1, ..., N and N≥4. They are coplanar. A camera directed towards the user captures images of the user's eyes. The corneal reflection of each light source $L_i$ on the eye is called a glint denoted by $G_1$-$G_4$. In the captured image, the detected glints are denoted by $g_1$-$g_4$. Also, p denotes the center of the detected pupil in the image. The cross-ratio method assumes that glints $G_i$'s are coplanar. Then, there exists a plane projectivity, expressed as a homography matrix, between $L_i$'s and $g_i$'s, and there exists another plane projectivity between $G_i$'s and $g_i$'s. The composition of two homography matrices is still a homography matrix, so $L_i$'s and $g_i$'s are related by a homography matrix, called the CR homography H, such that $$g_i = \mathcal{H}(HL_i), \quad (1)$$

where $\mathcal{H}(x)$ converts a homogeneous vector x into a 2D vector, and $L_i$ is in homogeneous coordinates, which is actually a 3D vector with the first two elements equal to $L_i$ and the last element equal to 1.

Once the mapping between $L_i$ and $g_i$ is known, the pupil center p can be mapped to the screen coordinate space, which is given by $$P = \mathcal{H}(H^{-1}p) \quad (2)$$

However, it is well-known that the eye optical axis, defined by the vector from the corneal center to the pupil center on the eye, is not the same as the visual axis, which defines the actual gaze. The angle between the two axes is person-dependent. Therefore, a subject-dependent calibration is used to correct this bias. To perform the bias correction, a user is asked to look at a plurality of calibration points (gaze positions) on the screen, which are considered as the ground truth of the gaze calibration points, denoted by $G_j$, with j as the index to the gaze positions. For each gaze position, the process detects the glints in the image, denoted by $g_{i,j}$, and the pupil center, denoted by $p_j$. From the $g_{i,j}$'s, the process computes the cross-ratio homography, $H_j$, from equation (1). The pupil center $p_j$ is mapped to the screen space as $P_j = \mathcal{H}(H_j^{-1}p_j)$ according to equation (2). Given a set of $P_j$'s and its corresponding ground truth gaze positions $G_j$'s, the homography-based cross-ratio method models the differences by a homography mapping as $$P_j = \mathcal{H}(H_b G_j) \quad (3)$$

where $H_b$ is the bias-correction homography matrix. During actual eye tracking, at each frame, the system is given a set of glints $g_i$'s and the pupil center p, and computes the cross-ratio homography matrix H according to equation (1). By combining equation (2) and equation (3), the gaze is then given by $$G = \mathcal{H}(H_b^{-1} H^{-1} p) \quad (4)$$

Turning to gaze estimation from both eyes under the binocular fixation constraint, the left and right parameters are related. For one, each left and right pair of glints are a projection of the same light source, so pairs of glints are related. For another, with binocular fixation, the left and right eyes are looking at the same gaze location. Note however because of noise-related errors and the like, independent left and right eye-estimations of the gaze location may not be the same. As will be understood, by considering them together as related, there are left and right measurements available, along with their relationships, and this redundancy leads to more accuracy and robustness to noise, for example.

As set forth below, the relationships between glints may be represented via equations (5) and (6). The relationships between pupil-related data (e.g., the left and right pupil centers $p^L$ and $p^R$, respectively) result from the eyes looking at the same gaze location G, whereby the mapping from $p^L$ should map to same gaze location G as $p^R$, which may be represented via Equations (7) and (8).

Thus, the glints between the left and right eyes are related by $H^{LR}$ which is given by:

$$H^{LR} = H^R H^{L-1} \quad (5)$$

To estimate $H^L$ and $H^R$, the following problem needs to be solved:

$$\min_{H^L, H^R} \sum_i \Big( \|g_i^L - \mathcal{H}(H^L L_i)\|^2 + \|g_i^R - \mathcal{H}(H^R L_i)\|^2 + \quad (6)$$
$$\frac{1}{2} \|g_i^R - \mathcal{H}(H^R H^{L-1} g_i^L)\|^2 + \frac{1}{2} \|g_i^L - \mathcal{H}(H^L H^{R-1} g_i^R)\|^2 \Big)$$

The coefficient ½ in the last two items is used to compensate for double use of the pair $(g_i^L, g_i^R)$ in two directions.

The gaze point on the screen is derived by expanding equation (4) for both eyes:

$$G^L = \mathcal{H}(H_b^{L-1} H^{L-1} p^L) \quad (7)$$

$$G^R = \mathcal{H}(H_b^{R-1} H^{R-1} p^R) \quad (8)$$

Note that $H_b^L$ and $H_b^R$ are left- and right-eye bias-correction homography matrices respectively, which adjust the disparity from the gaze location to the mapped pupil location. In the case when the user is fixating at the same point at the screen, i.e., $G^L = G^R = G$ the gaze point can be jointly estimated by minimizing the re-projection error between the pupil centers in the image and their corresponding estimations from the gaze point using both the cross-ratio and bias-correction homography matrices, i.e., $$\min_G \|p^L - \mathcal{H}(H^L H_b^L G)\|^2 + \|p^R - \mathcal{H}(H^R H_b^R G)\|^2 \quad (9)$$

It may be assumed that the noise in the left and right pupil locations is independent, isotropic, and identically distributed.

Turning to calibration for estimating the bias-correction homography matrices, $(H_b^L, H_b^R)$ for the left and right eyes using both eyes, the user looks at M gaze positions on the screen: $\{G_j | j=1, \ldots, M\}$. For each gaze position, there is a set of glints (indexed by i) for the left and right eyes, $\{(g_{ij}^L, g_{ij}^R) | i=1, \ldots, N; j=1, \ldots, M\}$ as well as pupil locations of the left and right eyes, $\{(P_j^L, P_j^R) | j=1, \ldots, M\}$. There is thus a tuple for each eye at gaze calibration position comprising the sets of glint data and pupil data.

In one or more implementations, the calibration operation comprises three steps. A first step is to estimate $(H_j^L, H_j^R)$ for each gaze position j using equation (6).

A second step is to compute the mapped pupil locations in the screen space: $(P_j^L, P_j^R)$. That is:

$$P_j^L = H_j^{L-1} p_j^L, \text{ and } P_j^R = H_j^{R-1} p_j^R \quad (10)$$

A third step is to separately estimate the bias-correction homography matrices ($H_b^L, H_b^R$) by minimizing the distances between the gaze positions and the corresponding mapped pupil locations in the screen, i.e., $$\min_{H_b^L} \sum_j \|P_j^L - \mathcal{H}(H_b^L G_j)\|^2, \quad (11)$$

$$\min_{H_b^R} \sum_j \|P_j^R - \mathcal{H}(H_b^R G_j)\|^2, \quad (12)$$

Figure 6:
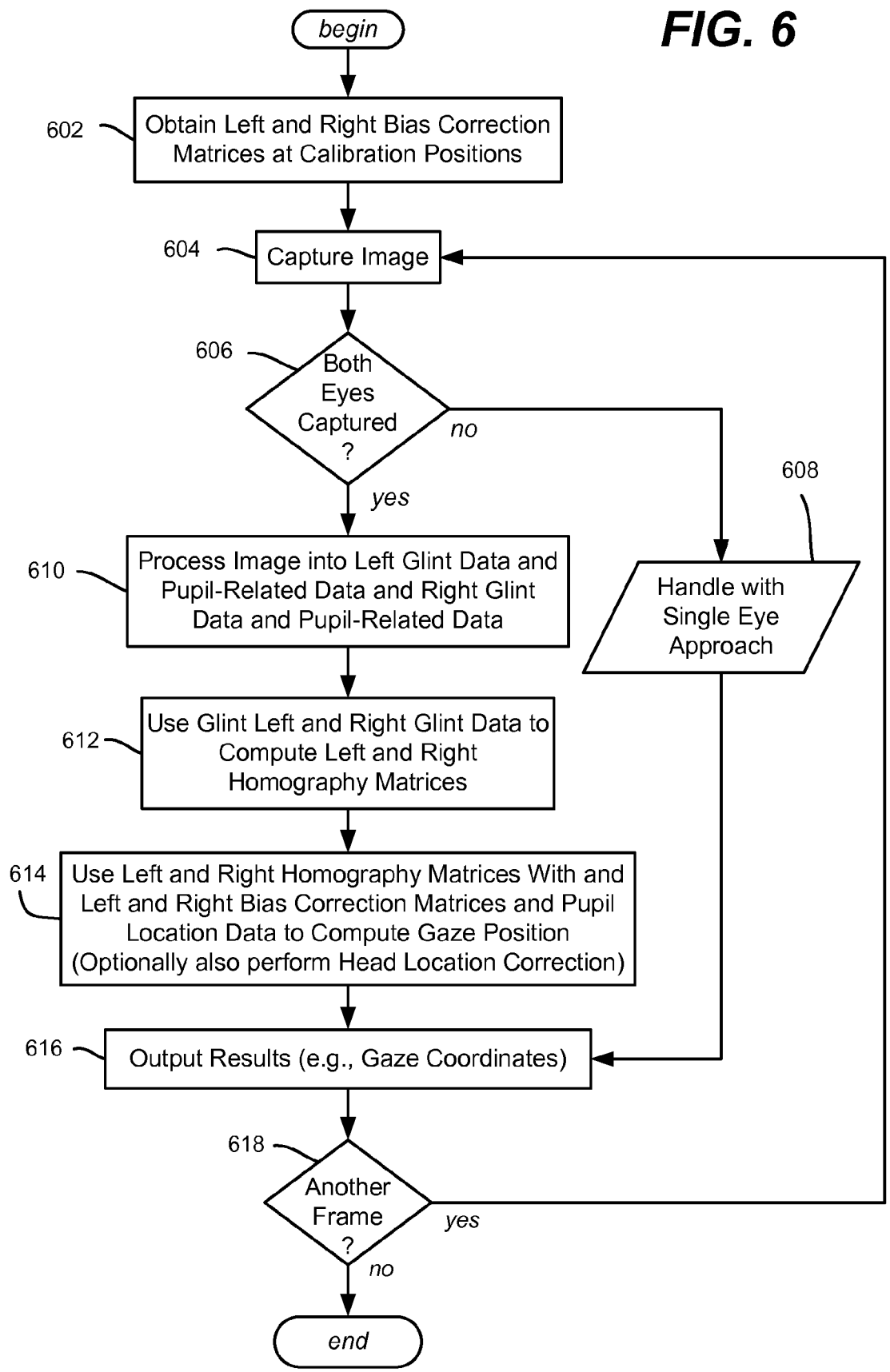
FIG. 6 is a flow diagram illustrating example steps that may be taken to obtain gaze information from a learned adaptive homography mapping model, according to one or more example implementations.

FIG. 6 is a generalized flow diagram showing example steps in online usage of the learned adaptive homography model. Step 602 represents the above-described calibration to obtain the left and right bias correction matrices; note that once calibrated, this information may be stored for a subject rather than recalibrated each time.

Step 604 captures the image, e.g., a frame in a series of frames. Step 606 represents an evaluation as to whether both eyes (e.g., four glints in each eye) are suitably captured. If only one eye is captured, the gaze is estimated at step 608 by whichever eye was suitably captured. (Note that if no suitable eye data is available, e.g., the subject eyelids were shut during the frame, the process may jump to step 618 to capture another frame.)

If data from both eyes are available, step 610 processes the image data into the glint data and pupil-related data for use in computing the left and right cross ratio homography matrices (step 612) as described above. Step 614 uses these matrices along with the bias correction matrices to jointly compute the gaze position as also described above (equation (9)).

Step 616 outputs the results. Step 618 repeats the process for another frame (until eye gaze detection is turned off, for example). The frame rate may be configured, and/or some smoothing operation may be used, to prevent too much jumping around.

The above technology may be combined with other eye gaze tracking technologies. For example, step 614 also optionally considers adapting for the current head position of the subject. As is understood, the head position of the subject tends to influence the positions and sizes of the glints that are captured. Thus, as one example, the technology described herein may be combined in a system with another technology based upon head positioning aspects, such as described in co-pending U.S. patent application Ser. No. 14/226,467, filed Mar. 26, 2014, entitled "EYE GAZE TRACKING BASED UPON ADAPTIVE HOMOGRAPHY MAPPING" (U.S. Patent Application Publication No. US 2015-0278599 A1, published Oct. 1, 2015).

As can be seen, there is provided eye gaze detection technology based upon data obtained from both eyes and the constraints that relate one eye's data to the other eye's data. Aspects are directed towards computing a current gaze location of a subject in a joint error minimization, in which at least four glints are captured in each eye, including computing a current left homography matrix and a current right homography matrix for use with left pupil data and right pupil data in the joint error minimization. Computing the current left homography matrix and the current right homography matrix may be based upon minimizing errors using light source locations, left eye glint locations and right eye glint locations.

Determining the current gaze location may include multiplying the left homography matrix with a left bias correction homography matrix and multiplying the right homography matrix with a right bias correction homography matrix. The correction matrices may be computed by obtaining tuples of left eye glint data, pupil data and right eye glint data, pupil data at a plurality of gaze calibration positions. The left and right glint data at each gaze calibration position may be used to compute a left and right homography matrix at each gaze position, respectively. Left and right screen-mapped pupil locations at each gaze position, with the left and right bias correction homography matrices computed by determining a distance between an actual gaze position and the left screen-mapped pupil location, and the distance between an actual gaze position and the right screen-mapped pupil location at each gaze position, respectively.

In one aspect, at least four light sources generate corneal reflections as pairs of left and right glints from a subject's left and right eyes. A camera captures a current image containing the left and right glints and left and right pupil data. A binocular computation model computes left and right homography matrices based upon the left and right glints, for use with the left and right pupil data in a joint computation of a gaze location. The binocular computation model may use left and right bias correction homography matrices.

The left and right bias correction homography matrices may be computed by obtaining tuples of left eye glint data, pupil data and right eye glint data, pupil data at a plurality of gaze calibration positions. A calibration process computes the left and right bias correction homography matrices using left glint data at each gaze calibration position to compute a left homography matrix at each gaze position, and using right glint data at each gaze calibration position to compute a right homography matrix at each gaze position. The calibration process computes left and right screen-mapped pupil locations at each gaze position, and determines a distance between an actual gaze position and the left screen-mapped pupil location at each gaze position to compute the left bias correction homography matrix, and determines another distance between an actual gaze position and the right screen-mapped pupil location at each gaze position to compute the right bias correction homography matrix.

One or more aspects are directed towards capturing an image including a subject's left and right eyes from which left and right glints and left and right pupil center information are extracted as left and right glint data and left and right pupil data, respectively. The left and right glint data, the left and right pupil data are used with left and right bias correction matrices to jointly determine a gaze location. The left and right glint data may be used to compute left and right homography matrices therefrom.

Left and right glint data and pupil data may be obtained for a plurality of gaze calibration positions for use in computing the left and right bias correction matrices. This may include computing the left and right bias correction matrices using left glint data at each gaze calibration position to compute a left homography matrix at each gaze position, using right glint data at each gaze calibration position to compute a right homography matrix at each gaze position, computing left and right screen-mapped pupil locations at each gaze calibration position, and determining a distance between an actual gaze position and the left screen-mapped pupil location at each gaze position to provide the left bias correction matrix, and determining a distance between an actual gaze position and the right screen-mapped pupil location at each gaze position to provide the right bias correction matrix. Head position information also may be used as a part of determining the gaze location.

Example Operating Environment

Figure 7:
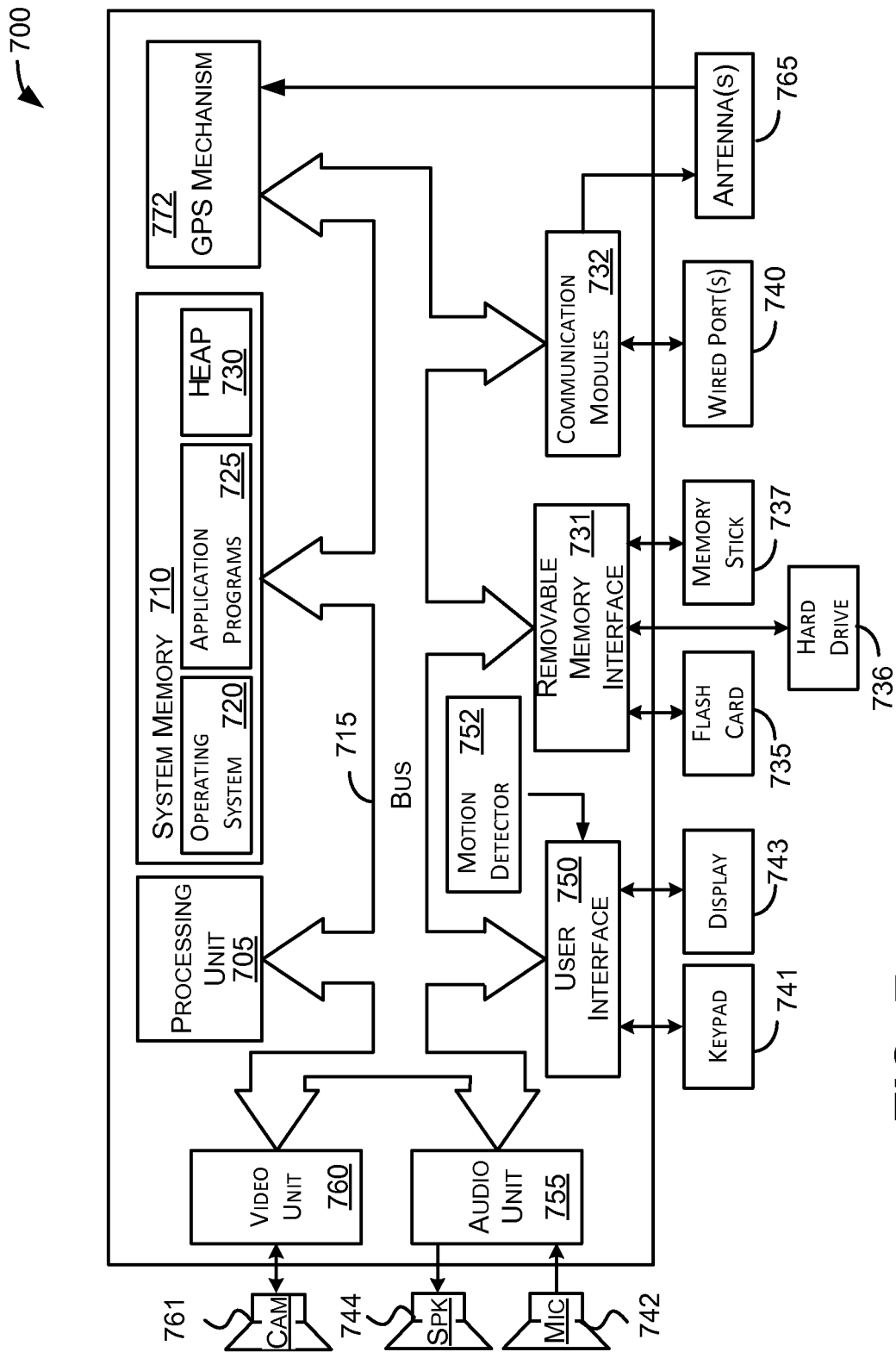
FIG. 7 is a block diagram representing an exemplary non-limiting computing system or operating environment, in the form of a mobile and/or handheld computing and/or communications device, into which one or more aspects of various embodiments described herein can be implemented.

FIG. 7 illustrates an example of a suitable mobile device 700 on which aspects of the subject matter described herein may be implemented. The mobile device 700 is only one example of a device and is not intended to suggest any limitation as to the scope of use or functionality of aspects of the subject matter described herein. Neither should the mobile device 700 be interpreted as having any dependency or requirement relating to any one or combination of components illustrated in the example mobile device 700. The mobile device may comprise a hand-held device such as a smartphone, tablet, laptop and so on. A personal computer may alternatively be used, for example, with camera(s) and light sources mounted to the display.

The example mobile device 700 may be worn on glasses, goggles or hats, or other wearable devices such as wrist-watch-type devices, including external computers are all suitable environments. Note that although glasses and hats are worn on the head, they may be worn in different positions relative to the head, and thus head position bias correction may be appropriate With reference to FIG. 7, an example device for implementing aspects of the subject matter described herein includes a mobile device 700. In some embodiments, the mobile device 700 comprises a cell phone, a handheld device that allows voice communications with others, some other voice communications device, or the like. In these embodiments, the mobile device 700 may be equipped with a camera for taking pictures, although this may not be required in other embodiments. In other embodiments, the mobile device 700 may comprise a personal digital assistant (PDA), hand-held gaming device, notebook computer, printer, appliance including a set-top, media center, or other appliance, other mobile devices, or the like. In yet other embodiments, the mobile device 700 may comprise devices that are generally considered non-mobile such as personal computers, servers, or the like.

Components of the mobile device 700 may include, but are not limited to, a processing unit 705, system memory 710, and a bus 715 that couples various system components including the system memory 710 to the processing unit 705. The bus 715 may include any of several types of bus structures including a memory bus, memory controller, a peripheral bus, and a local bus using any of a variety of bus architectures, and the like. The bus 715 allows data to be transmitted between various components of the mobile device 700.

The mobile device 700 may include a variety of computer-readable/machine-readable media. Such media can be any available media that can be accessed by the mobile device 700 and includes both volatile and nonvolatile media, and removable and non-removable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 700.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 710 includes computer storage media in the form of volatile and/or nonvolatile memory and may include read only memory (ROM) and random access memory (RAM). On a mobile device such as a cell phone, operating system code 720 is sometimes included in ROM although, in other embodiments, this is not required. Similarly, application programs 725 are often placed in RAM although again, in other embodiments, application programs may be placed in ROM or in other computer-readable memory. The heap 730 provides memory for state associated with the operating system 720 and the application programs 725. For example, the operating system 720 and application programs 725 may store variables and data structures in the heap 730 during their operations.

The mobile device 700 may also include other removable/non-removable, volatile/nonvolatile memory. By way of example, FIG. 7 illustrates a flash card 735, a hard disk drive 736, and a memory stick 737. The hard disk drive 736 may be miniaturized to fit in a memory slot, for example. The mobile device 700 may interface with these types of non-volatile removable memory via a removable memory interface 731, or may be connected via a universal serial bus (USB), IEEE 7394, one or more of the wired port(s) 740, or antenna(s) 765. In these embodiments, the removable memory devices 735-737 may interface with the mobile device via the communications module(s) 732. In some embodiments, not all of these types of memory may be included on a single mobile device. In other embodiments, one or more of these and other types of removable memory may be included on a single mobile device.

In some embodiments, the hard disk drive 736 may be connected in such a way as to be more permanently attached to the mobile device 700. For example, the hard disk drive 736 may be connected to an interface such as parallel advanced technology attachment (PATA), serial advanced technology attachment (SATA) or otherwise, which may be connected to the bus 715. In such embodiments, removing the hard drive may involve removing a cover of the mobile device 700 and removing screws or other fasteners that connect the hard drive 736 to support structures within the mobile device 700.

The removable memory devices 735-737 and their associated computer storage media, discussed above and illustrated in FIG. 7, provide storage of computer-readable instructions, program modules, data structures, and other data for the mobile device 700. For example, the removable memory device or devices 735-737 may store images taken by the mobile device 700, voice recordings, contact information, programs, data for the programs and so forth.

A user may enter commands and information into the mobile device 700 through input devices such as a key pad 741 and the microphone 742. In some embodiments, the display 743 may be touch-sensitive screen and may allow a user to enter commands and information thereon. The keypad 741 and display 743 may be connected to the processing unit 705 through a user input interface 750 that is coupled to the bus 715, but may also be connected by other interface and bus structures, such as the communications module(s) 732 and wired port(s) 740. Motion detection 752 can be used to determine gestures made with the device 700.

As described herein, eye glints and other eye-related data may be captured and processed for input. The processing may be performed in software, in hardware logic, or in a combination of software and hardware logic.

A user may communicate with other users via speaking into the microphone 742 and via text messages that are entered on the key pad 741 or a touch sensitive display 743, for example. The audio unit 755 may provide electrical signals to drive the speaker 744 as well as receive and digitize audio signals received from the microphone 742.

The mobile device 700 may include a video unit 760 that provides signals to drive a camera 761. The video unit 760 may also receive images obtained by the camera 761 and provide these images to the processing unit 705 and/or memory included on the mobile device 700. The images obtained by the camera 761 may comprise video, one or more images that do not form a video, or some combination thereof.

The communication module(s) 732 may provide signals to and receive signals from one or more antenna(s) 765. One of the antenna(s) 765 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 772. In turn, the GPS mechanism 772 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 700 may connect to one or more remote devices. The remote devices may include a personal computer, a server, a router, a network PC, a cell phone, a media playback device, a peer device or other common network node, and typically includes many or all of the elements described above relative to the mobile device 700.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for computing a current gaze location of a subject in a joint error minimization, the method comprising:
    capturing at a plurality of glints in a left eye of the subject and a plurality of glints in a right eye of the subject using at least four light sources;
    based on the plurality of glints captured in the left eye and a pupil center of the left eye, computing a left homography matrix;
    based on the plurality of glints captured in the right eye and a pupil center of the right eye, computing a right homography matrix; and
    combining the left homography matrix with the right homography matrix to determine the current gaze location.

2. The method of claim 1 further comprising multiplying the left homography matrix with a left bias correction homography matrix and multiplying the right homography matrix with a right bias correction homography matrix.

3. The method of claim 2 further comprising, computing the left and right bias correction homography matrices comprising obtaining tuples of left eye glint data, and tuples of right eye glint data at a plurality of gaze calibration positions.

4. The method of claim 3 wherein computing the left and right bias correction homography matrices further comprises using the left eye glint data and the right eye glint data obtained at the plurality of gaze calibration positions to compute additional left homography matrices and additional right homography matrices at respective gaze calibration positions.

5. The method of claim 4 further comprising, computing a left screen-mapped pupil location and a right screen-mapped pupil location at the respective gaze calibration positions.

6. The method of claim 5 wherein computing the left and right bias correction homography matrices comprises:
  computing the left bias correction homography matrix by determining a first distance between an actual gaze position and the left screen-mapped pupil location at the respective gaze calibration positions; and
  computing the right bias correction homography matrix by determining a second distance between the actual gaze position and the right screen-mapped pupil location at the respective gaze calibration positions.

7. A system comprising:
  a plurality of light sources, the plurality of light sources configured to generate corneal reflections as a first plurality of glints from a subject's left eye and a second plurality of glints from the subject's right eye, respectively, the first plurality of glints comprising a first set of glints corresponding to the plurality of light sources, and the second plurality of glints comprising a second set of glints corresponding to the plurality of light sources;
  a camera, the camera configured to capture a current image containing the first and second plurality of glints, a pupil center of the left eye, and a pupil center of the right eye; and
  a binocular computation corrector configured to:
    compute a left homography matrix based upon the first plurality of glints, and the pupil center of the left eye;
    compute a right homography matrix based upon the second plurality of glints, and the pupil center of the right eye; and
    combine the left homography matrix with the right homography matrix to determine a gaze location of the subject.

8. The system of claim 7 wherein the binocular computation corrector is further configured to use a left bias correction homography matrix and a right bias correction homography matrix.

9. The system of claim 8 wherein the binocular computation corrector is further configured to perform a calibration process configured to obtain the left and right bias correction homography matrices, comprising:
  obtaining tuples of left eye glint data at a plurality of gaze calibration positions;
  and
  obtaining tuples of right eye glint data at the plurality of gaze calibration positions, and
  obtaining tuples of left eye glint data, and tuples of right eye glint data at a plurality of gaze calibration positions.

10. The system of claim 9 wherein the calibration process is further configured to compute the left and right bias correction homography matrices using the left eye glint data and the right eye glint data obtained at the plurality of gaze calibration positions to compute additional left homography matrices and additional right homography matrices at respective gaze calibration positions.

11. The system of claim 10 wherein the calibration process is further configured to compute a left screen-mapped pupil location and a right screen-mapped pupil location at the respective gaze calibration positions.

12. The system of claim 10 wherein the calibration process is further configured to:
  determine a first distance between an actual gaze position and the left screen-mapped pupil location at the respective gaze calibration positions to compute the left bias correction homography matrix; and
  determine a second distance between the actual gaze position and the right screen-mapped pupil location at the respective gaze calibration positions to compute the right bias correction homography matrix.

13. The system of claim 7 wherein the plurality of light sources are coplanar.

14. The system of claim 7 wherein the plurality of light sources are arranged in a quadrilateral pattern.

15. One or more computer storage devices having executable instructions, which upon execution perform operations, comprising:
  capturing an image that includes a subject's left eye and the subject's right eye;
  extracting, from the image, a plurality of left glints and a plurality of right glints as left glint data and right glint data, respectively;
  extracting, from the image, left pupil center information and right pupil center information as left pupil data and right pupil data, respectively;
  computing a left bias correction matrix using the left glint data and the left pupil data;
  computing a right bias correction matrix using the right glint data and the right pupil data; and
  combining the left bias correction matrix with the right bias correction matrix to determine a gaze location of the subject.

16. The one or more computer storage devices of claim 15 having further executable instructions comprising using the left glint data to compute a left homography matrix and the right glint data to compute a right homography matrix.

17. The one or more computer storage devices of claim 16 further comprising computing a left screen-mapped pupil location and a right screen-mapped pupil location.

18. The one or more computer storage devices of claim 17 further comprising determining a distance between an actual gaze position and the left screen-mapped pupil location to compute the left bias correction matrix, and determining a distance between the actual gaze position and the right screen-mapped pupil location to compute the right bias correction matrix.

19. The one or more computer storage devices of claim 16 further comprising multiplying the left homography matrix with the left bias correction matrix and multiplying the right homography matrix with the right bias correction matrix.

20. The one or more computer storage devices of claim 15, wherein capturing an image comprises capturing a plurality of images for a plurality of gaze calibration positions, a respective one of the plurality of images corresponding to a respective one of the plurality of gaze calibration positions.

* * * * *